(12) United States Patent
Chauvelier

(10) Patent No.: US 8,983,731 B2
(45) Date of Patent: Mar. 17, 2015

(54) METHOD FOR CONTROLLING A POWER STEERING DEVICE FOR A MOTOR VEHICLE EQUIPPED WITH A STOP AND START SYSTEM

(75) Inventor: Eric Chauvelier, Le Mesnil Saint Denis (FR)

(73) Assignee: Renault s.a.s., Boulogne-Billancourt (FR)

( * ) Notice: Subject to any disclaimer, the term of this patent is extended or adjusted under 35 U.S.C. 154(b) by 0 days.

(21) Appl. No.: 13/995,670

(22) PCT Filed: Dec. 13, 2011

(86) PCT No.: PCT/FR2011/052962
§ 371 (c)(1),
(2), (4) Date: Jul. 15, 2013

(87) PCT Pub. No.: WO2012/085392
PCT Pub. Date: Jun. 28, 2012

(65) Prior Publication Data
US 2013/0297153 A1   Nov. 7, 2013

(30) Foreign Application Priority Data
Dec. 21, 2010   (FR) ...................................... 10 60972

(51) Int. Cl.
*B62D 5/04*      (2006.01)
*B62D 6/00*      (2006.01)
(Continued)

(52) U.S. Cl.
CPC ................ *B62D 6/001* (2013.01); *B62D 5/065* (2013.01); *B62D 5/064* (2013.01)
USPC .......................................... 701/42; 180/422

(58) Field of Classification Search
CPC .............................. B62D 5/064; B62D 5/0463

USPC ........................................ 701/42; 180/422, 42
See application file for complete search history.

(56) References Cited

U.S. PATENT DOCUMENTS

| 4,552,240 | A | * | 11/1985 | Takeshima et al. | ........... | 180/422 |
| 5,367,235 | A | * | 11/1994 | Fukudome | ..................... | 318/286 |
| 5,372,214 | A | * | 12/1994 | Haga et al. | ..................... | 180/422 |
| 5,786,674 | A | * | 7/1998 | Kress et al. | ................... | 318/268 |
| 5,954,152 | A | * | 9/1999 | Kada et al. | ..................... | 180/422 |

(Continued)

FOREIGN PATENT DOCUMENTS

| DE | 100 50 377 | 4/2001 |
| EP | 1 375 301 | 1/2004 |

(Continued)

OTHER PUBLICATIONS

JPO machine translation of JP 2008-238913 (original JP document published Oct. 9, 2008).*

(Continued)

*Primary Examiner* — Behrang Badii
*Assistant Examiner* — David Testardi
(74) *Attorney, Agent, or Firm* — Oblon, McClelland, Maier & Neustadt, L.L.P.

(57) ABSTRACT

A power-steering device and method for controlling a device for a motor vehicle including a stop and start system, the device including an electric pump unit including at least one electric motor and one processor. The method includes a stage in which the electric pump unit is switched to a standby mode by reducing rotation speed of the electric motor, this stage implemented by the processor following receipt of a control signal sent by the stop and start system to the processor, the signal representing an automatic switching of a heat engine into a stop mode. The method enables the power-steering device to be kept in operation during an automatic stopping phase of the heat engine, without resulting in unwanted noise or excessive electricity draw.

6 Claims, 2 Drawing Sheets

(51) Int. Cl.
  *B62D 5/065* (2006.01)
  *B62D 5/06* (2006.01)

(56) References Cited

U.S. PATENT DOCUMENTS

| | | | | |
|---|---|---|---|---|
| 6,298,941 | B1 * | 10/2001 | Spadafora | 180/422 |
| 6,305,489 | B1 * | 10/2001 | Kariatsumari | 180/422 |
| 7,303,044 | B2 * | 12/2007 | Lesther et al. | 180/422 |
| 7,584,816 | B2 * | 9/2009 | Miyajima et al. | 180/422 |
| 8,082,079 | B2 * | 12/2011 | Nakai | 701/41 |
| 8,418,801 | B2 * | 4/2013 | Izutani | 180/446 |
| 8,475,137 | B2 * | 7/2013 | Kobayashi et al. | 417/44.11 |
| 8,522,914 | B2 * | 9/2013 | Kimura et al. | 180/421 |
| 2009/0313987 | A1 | 12/2009 | Tu | |
| 2012/0185150 | A1 * | 7/2012 | Horii et al. | 701/102 |

FOREIGN PATENT DOCUMENTS

| | | | | | |
|---|---|---|---|---|---|
| FR | 2925451 | A1 * | 6/2009 | | B60R 25/02 |
| JP | 08020352 | A * | 1/1996 | | B62D 5/04 |
| JP | 2001106107 | A * | 4/2001 | | B62D 6/00 |
| JP | 2005271640 | A * | 10/2005 | | B62D 6/00 |
| JP | 2008238913 | A * | 10/2008 | | |
| JP | 2008260329 | A * | 10/2008 | | |
| JP | 2010173417 | A * | 8/2010 | | |

OTHER PUBLICATIONS

JPO machine translation of JP 2010-173417 (original JP document published Aug. 12, 2010).*
JPO machine translation of JP 2005-271640 (original JP document published Oct. 6, 2005).*
JPO machine translation of JP 2001-106107 (original JP document published Apr. 17, 2001).*
International Search Report Issued May 4, 2012 in PCT/FR11/052962 Filed Dec. 13, 2011.
French Search Report Issued Aug. 5, 2011 in FR 10 60972 Filed Dec. 21, 2010.

* cited by examiner

METHOD FOR CONTROLLING A POWER STEERING DEVICE FOR A MOTOR VEHICLE EQUIPPED WITH A STOP AND START SYSTEM

BACKGROUND

The invention relates to the field of power-steering devices.

More specifically, the invention concerns a method for controlling a power-steering device for a motor vehicle equipped with a stop & start system, the power-steering device including an electric pump unit having at least one electric motor and one processor.

An electrohydraulic power-steering device for a motor vehicle is known from the patent application published under number FR 2 864 000. This device includes an electric pump unit (GEP) incorporating four components that are assembled together such that the pump is driven in rotation by the electric motor under the control of the processor as a function of a signal representing the speed of the vehicle and a signal representing the speed of variation of the angle of the steering wheel. More specifically, when the steering wheel is actuated, the load of the electric motor increases and, as a function of this load increase, the current draw also increases. If the driver of the vehicle is not actuating the steering wheel, the electric motor turns with no load at an idling speed, which varies as a function of the speed of the vehicle. Following actuation of the steering wheel, and therefore a request for power steering, the electric motor turns at a suitable power-steering speed that varies as a function of the speed of the vehicle and the speed of the variation of the current of the motor. When the system determines that power steering is no longer being requested, the motor returns to its initial idling speed. In this device, the signal representing the speed of variation of the angle of the steering wheel is generated by the processor as a function of the current drawn by the electric motor.

This enables power-steering requests to be detected without the need for a steering wheel angle sensor.

A method for controlling an electric pump unit of an electrohydraulic power-steering device for a motor vehicle is also known from the patent application published under number FR 2 907 411. The processor is supplied by an electricity connector and a signal connector that sends the electrical signals required to determine the state of the vehicle. This latter is more specifically defined by the following parameters: the speed of the vehicle, the rotation speed of the steering wheel, the angle of the steering wheel, an automatic performance check and the state of the heat engine of the vehicle. The method involves controlling the electric motor for one or more successive periods not just as a function of respective predetermined values for the aforementioned parameters, but also as a function of a predetermined value of the current drawn by the electric motor of the power-steering device, this current being measured by the processor. This enables the electric pump unit to continue working at least temporarily if the signal connector is disconnected.

Furthermore, a system known as a stop & start system for stopping the heat engine of a vehicle under certain predetermined stopping conditions, then restarting the heat engine under predetermined restarting conditions is known. This system is intended to reduce the gasoline consumption of the vehicle and to reduce the exhaust gas emissions thereof, in particular for urban driving.

In a vehicle equipped with both a stop & start system and a power-steering device, it appears necessary to provide for the correlated control of these two devices. For example, the power-steering device is simply deactivated when the heat engine is in automatic stop mode.

In this regard, the patent application published under number DE 100 50 377 teaches a power-steering device for a motor vehicle equipped with a stop & start system. This device is intended to prevent sudden variations in the power steering force, when the engine is automatically stopped or restarted. To do so, the supply current of the electric motor of the power-steering device is adjusted as a function of the mode in which the motor is running, which may be a normal operating mode, an automatic stopping mode and an automatic restarting mode. If it is determined that the engine is in the automatic stopping mode, the current supplying the electric motor of the power-steering device is progressively eliminated according to a first predetermined behavior law. If it is determined that the engine is in automatic restarting mode, the current powering the electric motor of the power-steering device is progressively increased according to a second predetermined behavior law. If it is determined that the engine is in the normal control mode thereof, the power-steering device is adjusted in the normal way.

BRIEF SUMMARY

In this context, the present invention proposes a method for controlling a power-steering device for a motor vehicle equipped with a stop & start system that enables the power-steering device to be kept in operation during an automatic stopping phase of the heat engine, without operation of the electric motor resulting in unwanted noise or excessive electricity draw.

The present invention is also intended to enable intelligent automatic control of the power-steering device in the different usage scenarios of a vehicle equipped with a stop & start system.

For this purpose, the method for controlling a power-steering device for a motor vehicle equipped with a stop & start system, the power-steering device including an electric pump unit comprising at least one electric motor and one processor, essentially includes a stage in which the electric pump unit is switched to standby mode by reducing the rotation speed of the electric motor, this stage being implemented by the processor following receipt of a control signal sent by the stop & start system to the processor, this control signal representing an automatic switching of the heat engine into stop mode.

The method thus advantageously enables the power-steering device to be kept in operation during an automatic stopping phase of the heat engine, without operation of the electric motor resulting in unwanted noise or excessive electricity draw. Indeed, when the electric pump unit is in standby mode, the electric motor is idling: it generates less noise and draws less electricity such that an improvement in quality is genuinely perceived and battery discharging is avoided, respectively.

According to one feature, the method includes a stage in which the electric pump unit is reactivated by increasing the rotation speed of the electric motor from its rotation speed in standby mode up to its top rotation speed to provide adequate power steering, this stage being implemented by the processor following receipt of a control signal representing verification of one of the following conditions:

the condition involving automatic switching of the heat engine into start mode, the corresponding control signal being sent by the stop & start system to the processor, the condition involving determination by the processor that a predetermined threshold value has been exceeded by a measurement signal, said threshold value representing a predetermined angle of the steering wheel and/or a predetermined rotation speed of the steering wheel, the measurement signal representing the measurement by a sensor of the angle of the steering wheel and/or of the rotation speed of the steering wheel, the sensor sending the measurement signal to the processor via a signal connector, the condition involving determination by the processor that a predetermined threshold value has been exceeded by a measurement signal, said threshold value representing a predetermined electrical current passing through the electric motor, the measurement signal representing the electrical current passing through the electric motor, this latter being proportional to the angle and/or rotation speed of the steering wheel.

In the condition relating to the automatic switching of the heat engine into start mode, the method thus advantageously enables abrupt changes in the force of the power steering to be avoided when the engine is automatically restarted. Indeed, as the electric motor of the electric pump unit is not stopped, but switched to an idle rotation speed, reactivation of the electric pump unit does not involve restarting the electric motor, but increasing the rotation speed thereof, thereby providing an improvement in flexibility and reactivity that is directly perceived by the driver of the vehicle.

In the condition relating to the angle or rotation speed of the steering wheel, the method thus advantageously enables the power-steering device to be used when the steering wheel is being actuated, without thereby having to restart the thermal engine.

In the condition relating to the electrical current passing through the electric motor, the method thus advantageously enables the power-steering device to be used when the steering wheel is being actuated, even if the signal connector has been disconnected, or in the absence of any steering wheel rotation speed or angle sensor, even if the heat engine has been stopped.

According to another feature, the method includes an additional condition for switching the electric pump unit into standby mode from power steering mode, comprising:

a condition involving determination by the processor that a measurement signal has dropped below a predetermined threshold value, the threshold value representing a predetermined angle of the steering wheel and/or a predetermined rotation speed of the steering wheel, or a condition involving determination by the processor that a measurement signal has dropped below a predetermined threshold value, said threshold value representing a predetermined electrical current passing through the electric motor.

The method thus advantageously enables the electric pump unit of the power-steering device to be returned to standby mode not each time the heat engine is stopped by the stop & start device, but also when the steering wheel is no longer being actuated, even if the signal connector is disconnected.

According to another feature, the rotation speed of the electric motor is between 500 and 2500 revolutions per minute when the electric pump unit is in standby mode.

BRIEF DESCRIPTION OF THE DRAWINGS

Other features and advantages of the invention are clearly set out in the non-limiting description below, which is provided by way of example and with reference to the attached drawings, in which.

DETAILED DESCRIPTION

Figure 1:
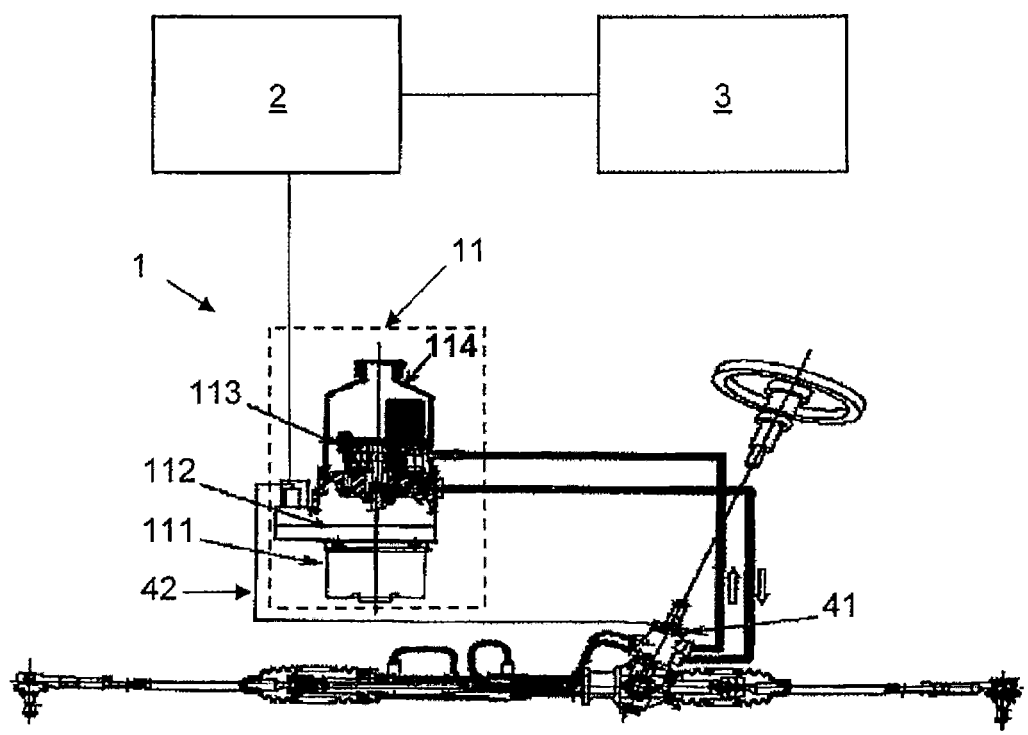
FIG. 1 is a schematic view of an embodiment of the power-steering device connected to a stop & start system.

As shown in FIG. 1, the power-steering device 1 is connected to the heat engine of the vehicle by means of a stop & start system 2. As the stop & start system manages the stopped or restarted state of the heat engine, it can thus advantageously communicate with the processor of the electric pump unit to warn it of a change of state of the heat engine.

The stop & start system enables the heat engine to be stopped when the vehicle is immobilized, and more specifically when the speed of the vehicle is zero or near zero, and when:

the mechanical gearbox is in neutral and the clutch pedal is in disengaged position, or the automatic gearbox is in N position.

The stop & start system also enables the heat engine to be restarted:

when the vehicle exceeds a predetermined speed, or when the clutch pedal is depressed, or when a gear is changed in the gearbox.

As shown in FIG. 1, the power-steering device includes an electric pump unit 11 (GEP). Said electric pump unit includes at least one electric motor 111 and one processor 112. As set out in the introduction, the electric pump unit also includes a hydraulic pump 113 and an oil tank 114.

Two types of electric pump unit are considered: a first having a sensor 41 of the angle A of the steering wheel and/or of the rotation speed VR of the steering wheel, and the second having none of these.

Figure 2:
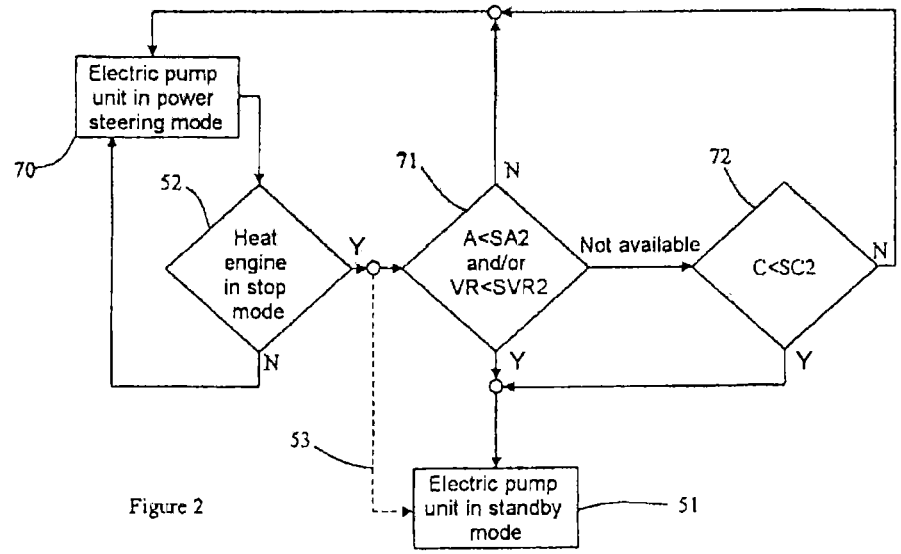
FIGS. 2 and 3 are schematic views of the method for controlling the power-steering device for a motor vehicle equipped with a stop & start system such as the one illustrated in FIG. 1.

The different stages of the method described below are shown schematically in FIGS. 2 and 3.

The method for controlling the power-steering device 1 includes a stage 51 in which the electric pump unit is put in standby mode. This stage involves reducing the rotation speed of the electric motor. The processor is linked to the stop & start system such that it receives a control signal representing an automatic switching of the heat engine 3 into stop mode. The switching of the electric pump unit into standby mode is symbolized by the dotted link 53 in FIG. 2.

Then, following receipt of this control signal, the processor runs stage 51 in which the electric pump unit is put in standby mode by reducing the electrical supply current of the electric motor until it reaches an idle rotation speed characteristic of the standby mode of the electric pump unit. The value of the electrical supply current of the electric motor in an idle rotation speed characteristic of the standby mode of the electric pump unit is hereinafter referred to as the standby electrical current value.

This state of the heat engine 3 in stop mode thus represents either the unique condition of the electric pump unit switching from the power-steering mode to standby mode, symbolized by reference sign 53 in FIG. 2, or one of the conditions, linked to other conditions, as specified below.

The method thus advantageously makes it possible to keep the power-steering device running, albeit slowly, during an automatic stopping phase of the heat engine. The idle operation of the electric motor significantly reduces unwanted noise. Indeed, the electric motor running slowly generates less noise, such that a quality gain is actually perceived. Operation of the electric pump unit unquestionably discharges the battery. As the battery is usually recharged by the alternator driven by the rotation of the heat engine, it is not recharged when the heat engine is stopped, in particular by the stop & start system. Advantageously, idle operation of the electric motor significantly reduces electricity draw and helps to prevent the battery from discharging.

Other conditions are required to ensure that, following receipt of this control signal, the processor runs stage 51 in which the electric pump unit is put in standby mode.

Figure 3:
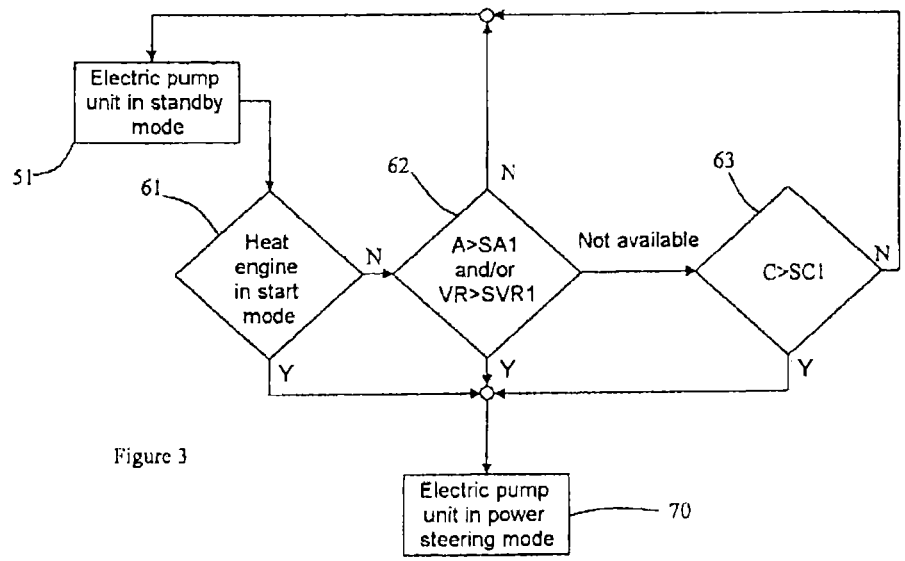

In addition to the stage in which the electric pump unit is put in standby mode, the method includes a stage 70 in which the electric pump unit is reactivated from the standby state thereof, as shown in FIG. 3. This stage involves increasing the rotation speed of the electric motor from its rotation speed in standby mode to its top rotation speed. The processor is linked to the stop & start system such that it receives a control signal representing an automatic switching of the heat engine 3 into start mode. Following receipt of this control signal, the processor runs stage 70 in which the electric pump unit is reactivated by increasing the electrical supply current of the electric motor until it reaches top rotation speed, this speed being characteristic of reactivating the electric pump unit. This automatic switching of the heat engine 3 into start mode is one of the alternative conditions for switching the electric pump unit from the standby mode to power-steering mode, symbolized by reference sign 61 in FIG. 3, which is the condition opposite to condition 52.

The method thus advantageously makes it possible to avoid sudden variations in the power-steering force when the engine is automatically restarted. Indeed, as the electric motor of the electric pump unit is not stopped, but switched to an idle rotation speed, reactivation of the electric pump unit does not involve restarting the electric motor, but increasing the rotation speed thereof, thereby improving flexibility and reactivity that is directly perceived by the driver of the vehicle.

It should be noted that the top rotation speed is defined as the rotation speed in ordinary operation mode of the electric pump unit enabling adequate power steering to be provided. Regardless of the actuation (in rotation) of the steering wheel, the electric pump unit is running at a speed defined by a table. Said table defines in particular the electrical supply current of the electric motor of the electric pump unit, in particular as a function of the actuation of the steering wheel and of the speed of the vehicle. The processor refers in particular to this table to determine the current to be supplied to the electric motor. More specifically, the table defines a minimum value for the supply current of the electric motor, this value representing non-actuation of the steering wheel and a zero or near-zero speed of the vehicle. When the steering wheel is actuated, the processor sets an electrical supply current of the electric motor that is in all cases greater than said minimum value.

The method also includes other alternative conditions for reactivating the electric pump unit, involving increasing the rotation speed of the electric motor from the standby-mode rotation speed to the top rotation speed thereof, to provide adequate power steering. Condition 62, shown in FIG. 3, is the determination by the processor that a predetermined threshold value SA1 and/or SVR1 has been exceeded by a measurement signal. More specifically, said threshold value represents a predetermined angle SA1 of the steering wheel and/or a predetermined rotation speed SVR1 of the steering wheel. Said measurement signal represents the measurement by a sensor 41 of the angle A of the steering wheel and/or of the rotation speed VR of the steering wheel. Moreover, the sensor continuously transmits the measurement signal to the processor via a signal connector 42. Once the processor has determined that the predetermined threshold value SA1 and/or SVR1 has been exceeded by the measurement signal, the processor runs stage 70 in which the electric pump unit is reactivated by increasing the electrical supply current of the electric motor until it reaches top rotation speed characteristic of the reactivation of the electric pump unit.

The method thus advantageously enables the power-steering device to be used when the steering wheel is being actuated, without thereby having to restart the thermal engine.

The method also includes an alternative condition 63 to the preceding conditions for reactivating the electric pump unit. Unlike conditions 61 and 62, condition 63 is realized once the processor has determined that a measurement signal has exceeded a predetermined threshold value SCI. Said threshold value represents a predetermined electrical current passing through the electric motor. Said measurement signal represents the electrical current C passing through the electric motor. This latter is proportional to the angle and/or rotation speed of the steering wheel. Indeed, regardless of the running speed of the electric pump unit, actuating the steering wheel increases the pressure in the hydraulic circuit. This pressure increases the resistive torque of the hydraulic pump 113 related to the electric motor 111. This increase in resistive torque results in an increase in the electrical energy drawn. As the voltage of the electrical network is near constant, this results in an increase in the current drawn by the electric pump unit. The processor, which intrinsically controls the supply current of the electric pump unit and more specifically the supply current of the electric motor, is advantageously arranged to detect the increase in the current drawn and to act on this increase by running stage 70 in which the electric pump unit is reactivated, and more specifically by increasing the electrical current supplying the electric motor until it reaches top rotation speed, when it determines that the predetermined threshold value SCI has been exceeded by the corresponding measurement signal.

The method thus advantageously enables the power-steering device to be used when the steering wheel is actuated, even if the signal connector 42 connecting the processor to the sensor 41 of the angle A of the steering wheel and/or of the rotation speed VR of the steering wheel is disconnected, without having to restart the heat engine. Moreover, the method can thus advantageously be adapted to electric pump units that do not have a sensor 41 of the angle A of the steering wheel and/or of the rotation speed VR of the steering wheel. Thus, the notation "not available" in FIG. 3 indicates either the absence of any sensor of the angle of the steering wheel or of the rotation speed of said steering wheel, or an erroneous measurement following a malfunction, for example in the event of disconnection of the signal connector.

If the electric pump unit is not switched to standby mode, but is stopped during automatic switching of the heat engine 3 into stop mode, stage 70 in which the electric pump unit is reactivated cannot be performed. Indeed, when the electric pump unit is stopped (zero speed), the processor is also stopped and does not detect the electrical current passing through the electric motor following actuation of the steering wheel.

According to an alternative embodiment, as mentioned above, the method includes other conditions required to switch the electric pump unit into standby mode when the heat engine has not been automatically restarted by the stop & start system according to condition 61/52 and following reactivation of the electric pump unit according to condition 62 or 63.

Thus, a condition 71 in which the electric pump unit is switched to standby mode, said condition therefore being associated to condition 52, is the determination by the processor that the corresponding measurement signal has dropped beneath a predetermined threshold value SA2 and/or SVR2 (sensor of the angle of the steering wheel or steering wheel rotation speed sensor). Said threshold value represents a predetermined angle SA2 of the steering wheel and/or a predetermined rotation speed SVR2 of the steering wheel. The fact that the heat engine has not been automatically restarted by the stop & start system means that the processor has not received the control signal representing automatic switching of the heat engine into start mode.

The method thus advantageously enables the electric pump unit of the power-steering device to be switched to standby mode once the steering wheel is no longer being actuated, during an automatic stopping phase of the heat engine.

The method includes, as an alternative or in addition to the preceding condition, a condition 72 in which the electric pump unit is switched to standby mode, said condition remaining associated to condition 52, i.e. if the heat engine has not been automatically restarted by the stop & start system and following reactivation of the electric pump unit according to one of conditions 62 or 63.

This condition 72 is realized once the processor has determined that the corresponding measurement signal has dropped beneath a predetermined threshold value SC2. Said threshold value represents a predetermined electrical current passing through the electric motor. The fact that the heat engine has not been automatically restarted by the stop & start system means that the processor has not received the control signal representing automatic switching of the heat engine into start mode.

The method thus advantageously enables the electric pump unit of the power-steering device to be switched to standby mode once the steering wheel is no longer being actuated, even if the signal connector 42 connecting the processor to the sensor 41 of the angle A of the steering wheel and/or of the rotation speed VR of the steering wheel is disconnected, during an automatic stop phase of the heat engine. Moreover, the method can thus advantageously be adapted to electric pump units that do not have a sensor 41 of the angle A of the steering wheel and/or of the rotation speed VR of the steering wheel. As explained previously, the notation "not available" in FIG. 3 indicates these two situations.

If the electric pump unit is switched to standby mode, the rotation speed of the electric motor is more specifically reduced to a rotation speed of between 500 and 2500 revolutions per minute.

The minimum value of the electric supply current of the electric motor, as defined above with reference to a table, is greater than the standby electrical current value, as defined above. By way of non-limiting example, the threshold value SCI is between said standby electrical current value and said minimum value. Also by way of non-limiting example, the threshold value SC2 is slightly greater than or equal to the minimum value.

By way of non-limiting example, to determine whether a value has dropped beneath or exceeded another value, the processor takes into account a duration, strictly less than an average stopping duration of the engine by the stop and start system during urban driving, during which each defined order ratio for the threshold values above must be true. This feature advantageously enables untimely changes of mode of the power-steering device to be avoided, for example as a result of disturbances of the measurement signals.

It should be obvious for persons skilled in the art that the present invention covers numerous other specific embodiments without leaving the scope of the invention as claimed. Consequently, the present embodiments should be treated as illustrations but may be modified within the field defined by the scope of the attached claims.

The invention claimed is:

1. A method for controlling a power-steering device for a motor vehicle including a stop and start system, the power-steering device including an electric pump unit including at least one electric motor and one processor, the method comprising:
   switching the electric pump unit to a standby mode by reducing rotation speed of the electric motor, the switching being implemented by the processor following receipt of a control signal sent by the stop and start system to the processor, the control signal representing an automatic switching of a heat engine into a stop mode; and
   reactivating the electric pump unit, from a standby mode by increasing the rotation speed of the electric motor from a rotation speed in the standby mode up to a top rotation speed, the reactivating being implemented upon the processor determining that a predetermined threshold value has been exceeded by a measurement signal, the threshold value representing a predetermined electrical current passing through the electric motor, the measurement signal representing the electrical current passing through the electric motor, the measurement signal being proportional to an angle and/or a rotation speed of a steering wheel of the motor vehicle.

2. The method according to claim 1,
   wherein the reactivating is implemented by the processor following receipt of a control signal representing verification of one of following conditions:
   a condition involving automatic switching of the heat engine into start mode, the corresponding control signal being sent by the stop and start system to the processor, or
   a condition involving determination by the processor that a predetermined threshold value has been exceeded by a measurement signal, the threshold value representing a predetermined angle of the steering wheel and/or a predetermined rotation speed of the steering wheel, the measurement signal representing the measurement by a sensor of the angle of the steering wheel and/or of the rotation speed of the steering wheel, the sensor continuously sending the measurement signal to the processor via a signal connector.

3. The method according to claim 1, further comprising an additional condition for switching the electric pump unit into standby mode, comprising:
   a condition involving determination by the processor that a measurement signal has dropped below a predetermined threshold value, the threshold value representing a predetermined angle of the steering wheel and/or a predetermined rotation speed of the steering wheel, or
   a condition involving determination by the processor that a measurement signal has dropped below a predetermined threshold value, the threshold value representing a predetermined electrical current passing through the electric motor.

4. The method according to claim 1, wherein the rotation speed of the electric motor is between 500 and 2500 revolutions per minute when the electric pump unit is in the standby mode.

5. The method according to claim 1, wherein the electric pump unit does not include a sensor of the angle of the steering wheel and the electric pump unit does not include a sensor of the rotation speed of the steering wheel.

6. The method according to claim 1, further comprising an additional condition for switching the electric pump unit into standby mode, comprising:
   a condition involving determination by the processor that a measurement signal has dropped below a predetermined threshold value, the threshold value representing a predetermined electrical current passing through the electric motor.

* * * * *